(12) United States Patent
Zagorski et al.

(10) Patent No.: US 10,196,063 B2
(45) Date of Patent: Feb. 5, 2019

(54) VEHICLES, SYSTEMS, AND METHODS FOR SHIFTING MANUAL TRANSMISSIONS INTO NEUTRAL DURING AUTONOMOUS BRAKING

(71) Applicant: GM GLOBAL TECHNOLOGY OPERATIONS LLC, Detroit, MI (US)

(72) Inventors: Chad T. Zagorski, Clarkston, MI (US); Michael G. Carpenter, Romeo, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 80 days.

(21) Appl. No.: 15/627,311

(22) Filed: Jun. 19, 2017

(65) Prior Publication Data

US 2018/0362045 A1    Dec. 20, 2018

(51) Int. Cl.
| | |
|---|---|
| *B60W 10/11* | (2012.01) |
| *B60W 30/18* | (2012.01) |
| *F16H 61/02* | (2006.01) |
| *B60W 10/18* | (2012.01) |
| *F16H 59/54* | (2006.01) |
| *F16H 59/70* | (2006.01) |
| *F16H 59/44* | (2006.01) |
| *F16H 59/36* | (2006.01) |
| *F16H 59/74* | (2006.01) |
| *F16H 59/56* | (2006.01) |

(52) U.S. Cl.
CPC ...... *B60W 30/18109* (2013.01); *B60W 10/11* (2013.01); *B60W 10/182* (2013.01); *F16H 61/0213* (2013.01); *B60W 2510/0208* (2013.01); *B60W 2510/0638* (2013.01); *B60W 2510/101* (2013.01); *B60W 2520/10* (2013.01); *B60W 2710/1005* (2013.01); *B60W 2710/186* (2013.01); *B60W 2720/10* (2013.01); *B60Y 2300/70* (2013.01); *B60Y 2302/00* (2013.01); *B60Y 2400/4024* (2013.01); *F16H 59/44* (2013.01); *F16H 59/54* (2013.01); *F16H 59/56* (2013.01); *F16H 59/70* (2013.01); *F16H 2059/366* (2013.01); *F16H 2059/743* (2013.01); *F16H 2061/0234* (2013.01)

(58) Field of Classification Search
USPC .................................................... 192/220.1
See application file for complete search history.

(56) References Cited

U.S. PATENT DOCUMENTS

| | | | | |
|---|---|---|---|---|
| 3,618,718 A | * | 11/1971 | Blaauw | G05G 13/00 188/67 |
| 4,113,076 A | * | 9/1978 | Lee | B60T 13/12 188/106 P |

(Continued)

*Primary Examiner* — Dirk Wright
(74) *Attorney, Agent, or Firm* — Lorenz & Kopf, LLP

(57) ABSTRACT

Vehicles, systems, and methods for shifting a manual transmission into neutral during autonomous braking are provided. An exemplary system for shifting a vehicle into neutral during autonomous braking includes a manual transmission for transferring power from an engine to a differential using gears manually selected by a gear selector. Also, the system includes an actuator mounted to the vehicle and to the gear selector. Further, the system includes a controller coupled to the actuator and configured to direct the actuator to force the gear selector into neutral during an autonomous braking event.

20 Claims, 6 Drawing Sheets

(56) References Cited

U.S. PATENT DOCUMENTS

| | | | | |
|---|---|---|---|---|
| 5,111,921 A * | 5/1992 | Marks | ............... | B60T 11/103 |
| | | | | 180/271 |
| 6,314,801 B1 * | 11/2001 | Reggiardo | ............ | F16H 61/20 |
| | | | | 73/112.01 |
| 6,542,804 B2 * | 4/2003 | Muratomi | ............ | F16H 61/20 |
| | | | | 477/116 |
| 6,910,565 B2 * | 6/2005 | Gevay | ................ | F16H 59/10 |
| | | | | 192/220.1 |
| 9,944,288 B1 * | 4/2018 | Hu | ..................... | B60T 8/17 |
| 10,046,768 B2 * | 8/2018 | Tinker | ............. | B60W 10/06 |

* cited by examiner

VEHICLES, SYSTEMS, AND METHODS FOR SHIFTING MANUAL TRANSMISSIONS INTO NEUTRAL DURING AUTONOMOUS BRAKING

INTRODUCTION

The present disclosure generally relates to automotive vehicles equipped with automatic braking systems and manual transmissions, and more particularly relates to vehicles, systems and methods for shifting manual transmissions into neutral during autonomous braking.

Modern Automatic Emergency Braking (AEB) systems may be implemented on vehicles with either automatic or manual transmissions. A typical AEB system is designed to automatically apply a vehicle's brakes when an imminent collision is detected in an attempt to avoid the collision, when possible, or to mitigate the severity of the collision if avoidance is not possible. On automatic transmission applications, the AEB system can bring the vehicle to a complete stop without stalling the engine. On manual transmission applications, if the transmission is in gear (not neutral), the vehicle will stall during emergency braking if the driver does not physically depress the clutch pedal.

Accordingly, it is desirable to provide vehicles, systems and methods for shifting manual transmissions into neutral during autonomous braking. Such a vehicle, system, or method may be provided to prevent an engine with a manual transmission from stalling during autonomous braking. Furthermore, other desirable features and characteristics will become apparent from the subsequent detailed description and the appended claims, taken in conjunction with the accompanying drawings and the introduction.

SUMMARY

Vehicles, systems and methods for shifting manual transmissions into neutral during autonomous braking are provided. An exemplary system for shifting a vehicle into neutral during autonomous braking includes a manual transmission for transferring power from an engine to a differential using gears manually selected by a gear selector. Also, the system includes an actuator mounted to the vehicle and to the gear selector. Further, the system includes a controller coupled to the actuator and configured to direct the actuator to force the gear selector into neutral during an autonomous braking event.

Another embodiment provides a method for shifting a manual transmission of a vehicle into neutral during autonomous braking. The exemplary method includes recognizing that autonomous braking is commanded. Further, the method includes determining that the vehicle is nearing a stall. Also, the method includes forcing a gear selector into neutral position.

In another embodiment, a vehicle capable of automatically shifting a manual transmission into neutral during autonomous braking is provided. The vehicle includes an automatic braking system, an engine, and a differential. The manual transmission is configured to transfer power from the engine to the differential using gears manually selected by a gear selector. Further, the vehicle includes an actuator for automatically shifting from a selected gear to neutral.

BRIEF DESCRIPTION OF THE DRAWINGS

The present subject matter will hereinafter be described in conjunction with the following drawing figures, wherein like numerals denote like elements, and wherein.

DETAILED DESCRIPTION

The following detailed description is merely exemplary in nature and is not intended to limit the subject matter claimed herein. Furthermore, there is no intention to be bound by any theory presented in the preceding background or the following detailed description.

Embodiments herein provide for avoiding stalling of a vehicle during an autonomous braking event. Specifically, when an automatic braking system is used to stop or nearly stop a vehicle with a manual transmission when the vehicle is in a drive gear, the vehicle engine may stall. Embodiments herein avoid vehicle stalling by automatically shifting the vehicle out of a drive gear and into neutral. For example, embodiments provided herein shift the vehicle into neutral by physically decoupling the gear selector from the drive gear. In an exemplary embodiment, a mechanical device is provided to push the gear selector out of gear and into the neutral gate during automated braking and before the engine stalls. If the driver of the vehicle is not responsive and if the vehicle is not capable of holding the stop indefinitely, the mechanical device can push the gear selector back into a drive gear to purposefully create a stall, to prevent a vehicle roll-away.

Exemplary embodiments are provided for vehicles equipped with manual transmissions and AEB systems. Such embodiments prevent the vehicle's engine from stalling during an AEB activation on the manual transmission vehicle, providing the driver with enhanced controllability of the vehicle following the AEB activation. In the event of an AEB activation that avoids an impact or during a false activation of the AEB system resulting in a full vehicle stop, avoiding engine stall allows the driver to more quickly recover and resume driving. In cases where the collision is mitigated but still occurs, automatically pushing the gear selector into neutral prevents the stall and allows the driver to more quickly move the vehicle off the road, reducing the risk of collision with other vehicles.

Figure 1:
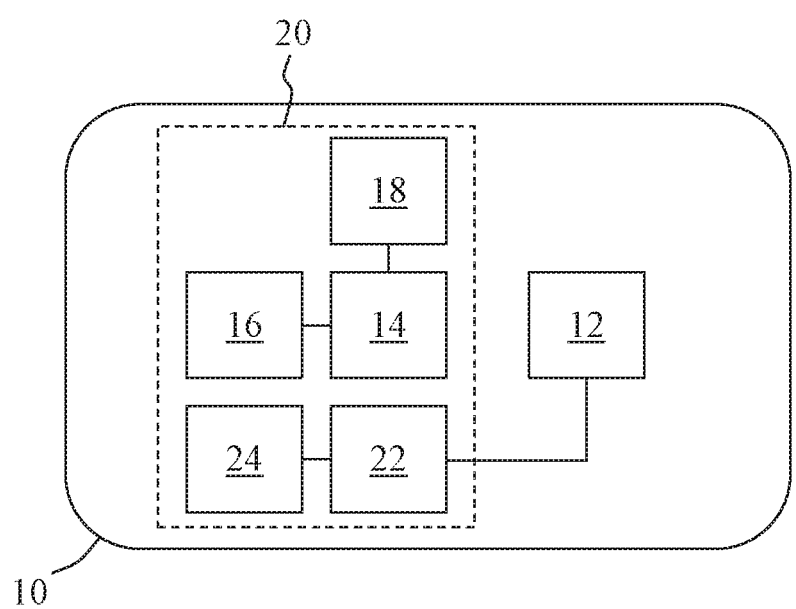
FIG. 1 is a schematic diagram of a vehicle provided with a system for automatically shifting the vehicle into neutral in accordance with an embodiment herein.

FIG. 1 is a schematic diagram illustrating a vehicle 10 provided with a system 20 for shifting the vehicle 10 into neutral during autonomous braking. As shown, the vehicle 10 includes an automatic braking system 12. Further, the vehicle 10 has a manual transmission 14 for transferring power from an engine 16 to a differential 18. The vehicle 10 also includes a controller 22 for automatically shifting into neutral as described below. In certain embodiments, the vehicle 10 is further provided with a vehicle hold mechanism 24, such as an electric parking brake. In certain embodiments, the controller 22 is electronically coupled to the automatic braking system 12, manual transmission 14, engine 16, differential 18, and vehicle hold mechanism 24, such through direct or indirect connection, to receive signals or data and/or to provide direction thereto.

Figure 2:
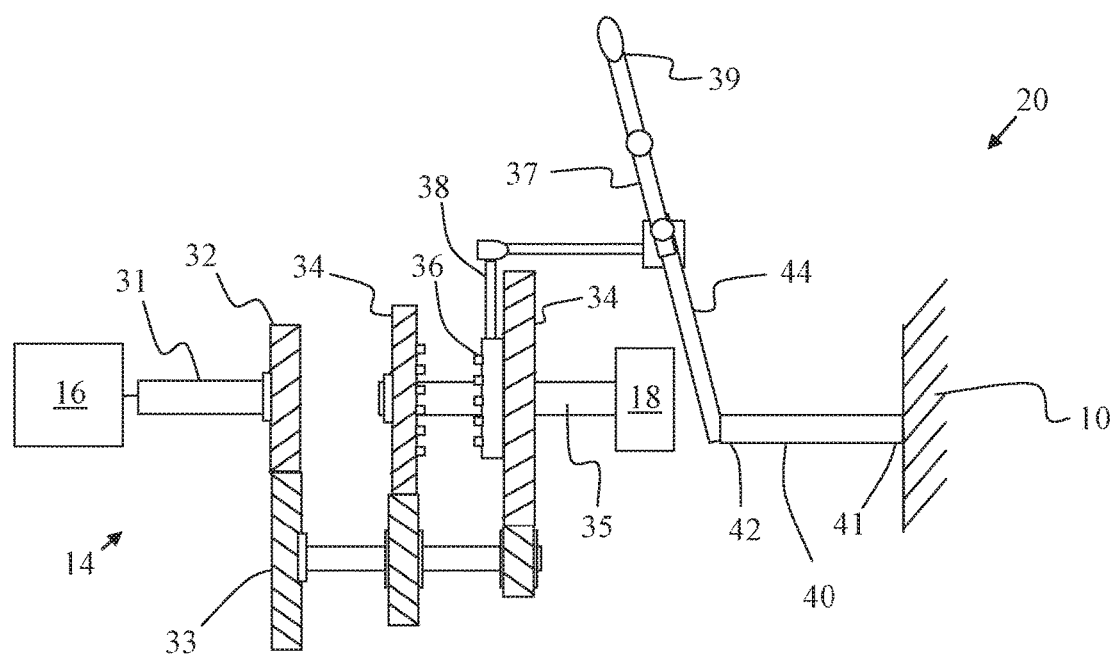
FIG. 2 is a schematic diagram illustrating components of an exemplary manual transmission and system of the vehicle of FIG. 1, with the transmission in a drive gear, in accordance with an embodiment herein.
Figure 3:
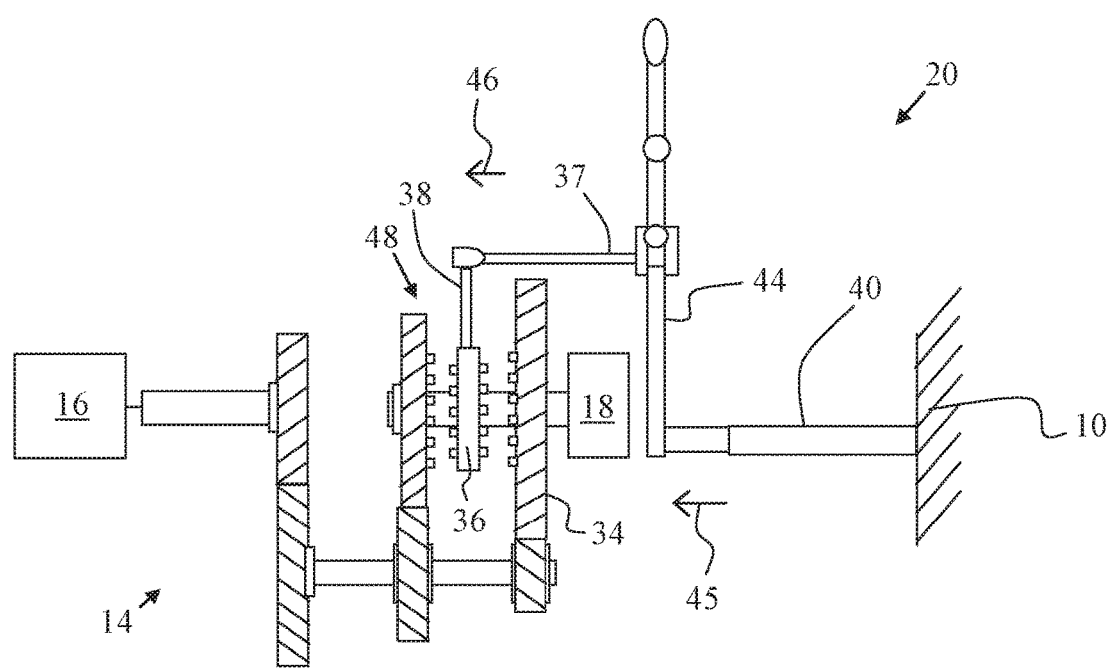
FIG. 3 is a schematic diagram of the manual transmission and system of FIG. 2, with the transmission in neutral, in accordance with an embodiment herein.

FIGS. 2 and 3 provide a schematic diagram illustrating components of an exemplary manual transmission 14 and system 20 of the vehicle 10 of FIG. 1, according to an embodiment. FIG. 2 illustrates the transmission 14 in a drive gear, while FIG. 3 illustrates the transmission 14 after being shifted into neutral. In FIGS. 2 and 3, the transmission 14 is provided to transfer power from engine 16 to differential 18. To that end, an engine shaft 31 and engine gear 32 are provided in connection with engine 16. As shown, the engine gear 32 is connected to a geared layshaft 33. Further, the manual transmission 14 includes drive gears 34 connected to the geared layshaft 33 and that ride on bearings to spin about drive shaft 35, which is connected to differential 18. When the vehicle 10 coasts in neutral, drive shaft 35 can rotate inside the drive gears 34 while the drive gears 34 and the layshaft 33 are motionless.

As further shown, the manual transmission 14 includes a collar 36 that may connect a selected drive gear 34 to the drive shaft 35. The collar 36 is connected directly to the drive shaft 35 and spins with the drive shaft 35. However, the collar 36 can slide laterally, left or right, along the drive shaft 35 to engage either of the drive gears 34. Teeth on the collar 36, typically called dog teeth, fit into holes on the sides of the drive gears 34 to engage the selected drive gear 34.

As shown, a gear selector 37 is provided for physically shifting the collar 36 into and out of connection with the drive gears 34. The gear selector 37 includes a gear selector fork 38 that is connected to the collar 36 to physically move the collar 36 laterally into and out of connection with the drive gears 34. Further, the gear selector 37 includes a gear lever 39 that may be physically manipulated by a driver in the cabin of the vehicle.

Further, the system 20 of FIGS. 2 and 3 includes an actuator 40 for automatically shifting from a selected gear 34 to neutral. In FIGS. 2 and 3, one end 41 of the actuator 40 is mounted to a structure or component of the vehicle 10. The other end 42 of the actuator 40 is connected to an extension 44 of the gear lever 39 of the gear selector 37. An exemplary actuator 40 is an electromechanical or hydraulic device that extends to increase the distance between end 41 and end 42 or contracts to decrease the distance between end 41 and end 42.

FIG. 2 illustrates the collar 36 in connection with a selected gear 34. In FIG. 3, the actuator 40 has extended by the length of and in the direction of arrow 45. As a result, the gear lever extension 44 has caused movement of the gear selector 37, and the gear selector fork 38 of the gear selector 37 has moved the collar 36 a distance indicated by the length and direction of arrow 46. As shown, the collar 36 has moved into a neutral location 48, i.e., out of connection with any gear 34 or "out of gear". Effectively, in FIG. 3, the actuator 40 has shifted the transmission 14 out of the selected gear 34 and into neutral 48.

The system 20 is further provided for shifting the manual transmission 14 out of neutral 38 and back into a selected gear 34. For example, the actuator 40 may contract by the length of and in the opposite direction of arrow 45. As a result, the collar 36 is moved by the gear selector 37 by the length of and in the opposite direction of arrow 46, from the neutral location 48 and back into connection with the selected gear 34. Alternatively, the actuator 40 may extend farther in the direction of arrow 45 to move the collar 36 into engagement with the previously non-selected gear 34.

Figure 4:
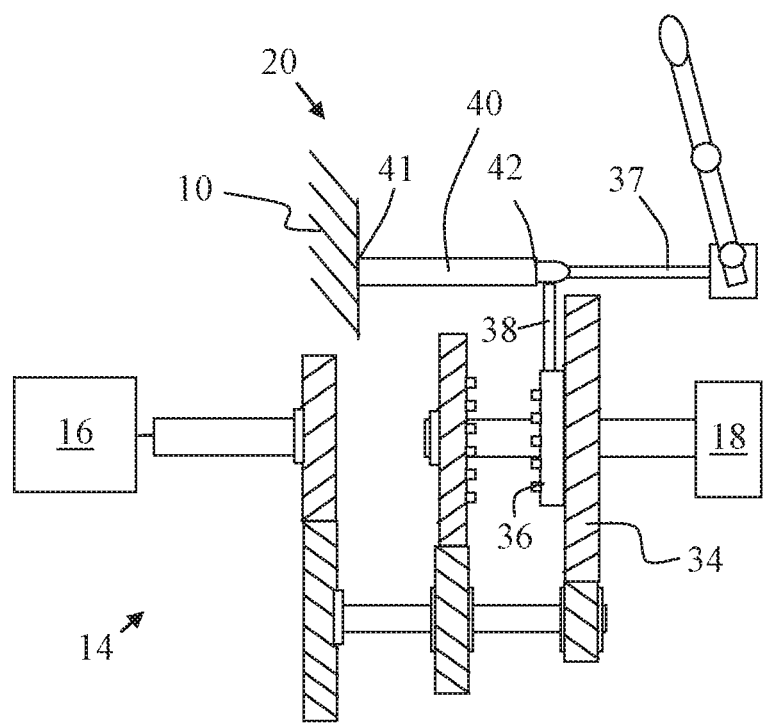
FIG. 4 is a schematic diagram illustrating components of another exemplary manual transmission and system of the vehicle of FIG. 1, with the transmission in a drive gear, in accordance with an embodiment herein.
Figure 5:
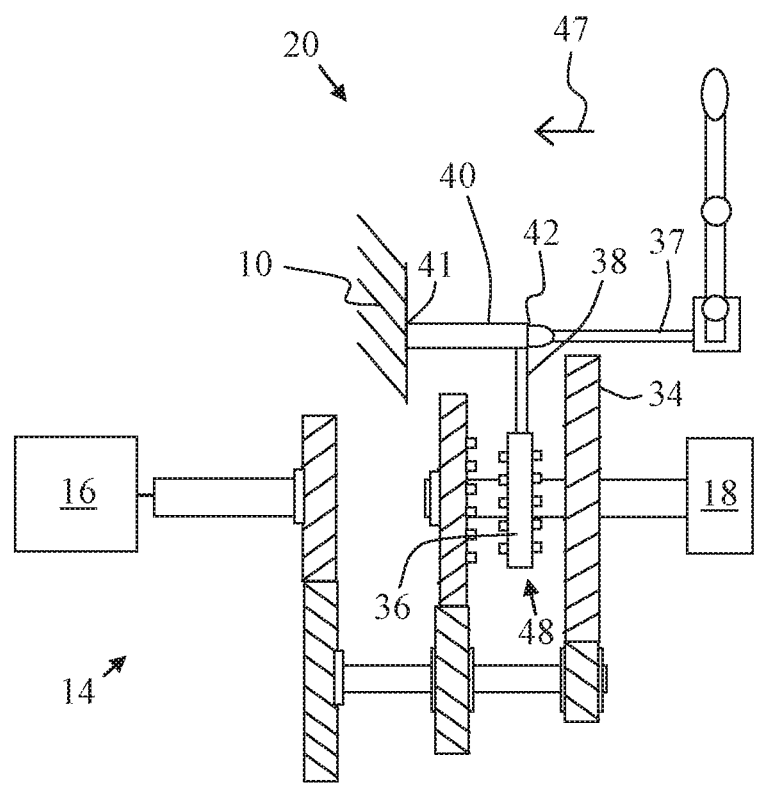
FIG. 5 is a schematic diagram of the manual transmission and system of FIG. 4, with the transmission in neutral, in accordance with an embodiment herein.

FIGS. 4 and 5 illustrate an alternate embodiment of the transmission 14 and system 20 of FIGS. 2 and 3. In FIGS. 4 and 5, the actuator 40 is mounted for direct connection to the gear selector fork 38 of the gear selector 37. Specifically, end 42 of actuator 40 is connected directly to the gear selector fork 38. Further, end 41 of the actuator 40 is mounted directly to a structure or component of the vehicle 10. As shown, the gear selector fork 38 is connected to the collar 36 and the collar 36 is connected to a selected gear 34.

In FIG. 5, the actuator 40 has contracted to reduce the distance between end 41 and end 42 by the length of and in the direction of arrow 47. As a result, the gear selector fork 38 of the gear selector 37 has moved the collar 36 in the same distance and direction indicated by arrow 47. As shown, the collar 36 has moved into the neutral location 48. Effectively, in FIG. 5, the actuator 40 has shifted the transmission 14 out of the selected gear 34 and into neutral 48.

The system 20 of FIGS. 4 and 5 further provide for shifting the manual transmission 14 out of neutral 38 and back into a selected gear 34. For example, the actuator 40 may extend by the length of and in the opposite direction of arrow 47. As a result, the collar 36 is moved by the gear selector 37 by the length of and in the opposite direction of arrow 47, from the neutral location 48 and back into connection with the selected gear 34. Alternatively, the actuator 40 may contract farther in the direction of arrow 47 to move the collar 36 into engagement with the previously non-selected gear 34.

FIGS. 2-3 and 4-5 describe the mechanics of systems 20 for automatically shifting a vehicle 10 out of drive gear and into neutral. Such embodiments may be provided to avoid vehicle stalling during an autonomous braking event. Further, as described the systems 20 may provide for shifting a vehicle out of neutral and back into a selected drive gear. Such an application may be useful after an autonomous braking event has ended, if a driver has not taken control of the vehicle. In other words, such an application may prevent a vehicle from freely rolling in neutral after autonomous braking has ended by purposefully causing the vehicle to stall.

Figure 6:
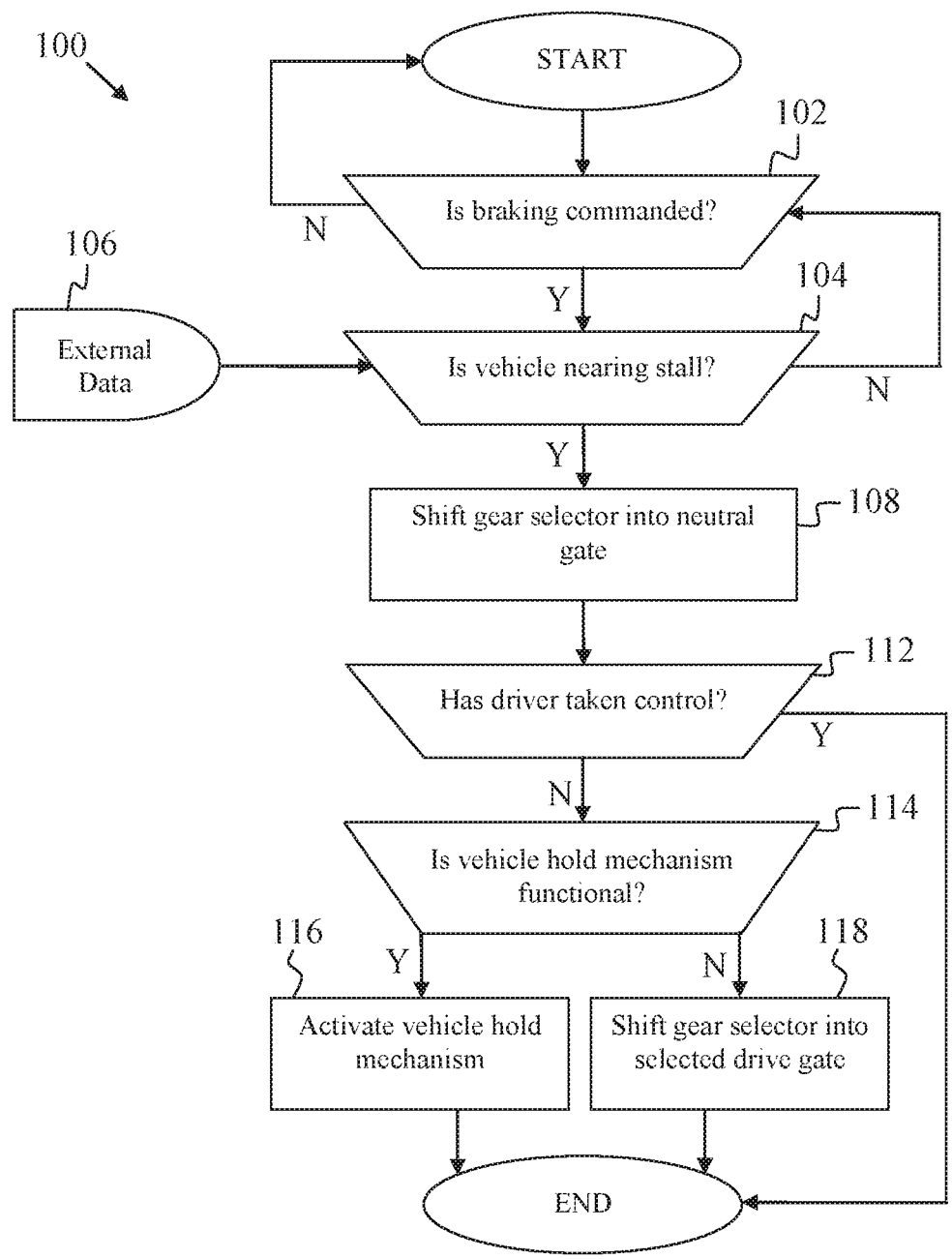
FIG. 6 is a flow chart illustrating a method for shifting a vehicle into neutral during autonomous braking in accordance with an embodiment herein.

FIG. 6 provides a flow chart illustrating a method 100 for shifting a vehicle into neutral during autonomous braking. As shown, the method 100 includes recognizing that autonomous braking is commanded at query 102. Such a query may be performed through continuously sensing whether an automatic braking system is engaged and actively braking the vehicle. If autonomous braking is not commanded, then the method 100 restarts and continues monitoring for an autonomous braking event. If autonomous braking is commanded and an autonomous braking event is recognized, then the method includes determining whether the vehicle is nearing a stall at query 104. In an exemplary embodiment, determining that the vehicle is nearing a stall includes monitoring engine speed, vehicle speed, current selected gear, and/or clutch engagement status. Thus, external data 106 including, for example, engine speed, vehicle speed, current selected gear, and/or clutch engagement status, may be provided to determine whether the vehicle is nearing a stall. In an exemplary embodiment, a vehicle stall status may be indicated by an engine speed at a selected percentage below engine idle speed. Such percentage may vary by vehicle model and powertrain, but in an exemplary embodiment a vehicle may be determined to be nearing a stall situation when the engine speed is at about 60% of the engine idle speed. For example, a vehicle with an engine idle speed of about 800 rpms may be nearing stalling at about 500 to about 600 rpms.

If the vehicle is not nearing stall, then query 102 is continued by monitoring the external data 106. If the vehicle is nearing stall, then method shifts the vehicle into neutral at action 108, such as by forcing the gear selector into neutral position. Specifically, the actuator 40 may be directed to physically move the gear selector into the neutral position.

Then the method includes ascertaining whether a driver has taken control of the vehicle at query 112. For example, various sensors may be utilized to determine whether the driver is operating the steering wheel, or clutch, brake and/or accelerator pedals. Such an action is performed to ensure that the vehicle is not in an unsafe condition such as when the vehicle is rolling freely without operator or system control. If it is ascertained that a driver has taken control, then the event in which the vehicle was shifted into neutral may be considered to be ended, and the method 100 may restart.

If it is ascertained that the driver has not taken control of the vehicle at query 112, then the method 100 includes causing the vehicle to stop. Specifically, at query 114 the method determines whether the vehicle includes a vehicle hold mechanism, such as an electric park brake, and whether such mechanism is functional. If yes, then the method includes activating the vehicle hold mechanism to stop the vehicle at action 116. If no, then the method includes shifting the gear selector back into a selected drive gear at action 118, such as by forcing the gear selector out of the neutral position and into connection with the selected gear. Specifically, the actuator 40 may be directed to physically move the gear selector into connection with the selected gear.

In method 100, each of query actions 102, 104, 112, 114 may be performed by controller 22, whether integrated into a larger vehicle system computer or as an additional controller indicated for the system 20. Further, such controller 22 may direct actions 108, 116, and 118 to be performed by the actuator 40 or vehicle hold mechanism 24.

As described herein, stalling of a vehicle may be avoided during an autonomous braking event. In exemplary embodiments, a manual transmission vehicle with an automatic braking system avoids stalling by automatically shifting out of a drive gear and into neutral. For example, embodiments provided herein shift the vehicle into neutral by physically decoupling the gear selector from the drive gear through use of a mechanical device is provided to push the gear selector out of gear and into the neutral gate. Further, the mechanical device can push the gear selector back into a drive gear to purposefully create a stall to prevent a vehicle roll-away.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the claimed subject matter in any way. Rather, the foregoing detailed description will provide those skilled in the art with a convenient road map for implementing an exemplary aspect of the subject matter. It being understood that various changes may be made in the function and arrangement of elements described in an exemplary aspect without departing from the scope of the subject matter as set forth in the appended claims.

What is claimed is:

1. A system for shifting a vehicle into neutral during autonomous braking, the system comprising:
    a manual transmission for transferring power from an engine to a differential using gears manually selected by a gear selector;
    an actuator mounted to the vehicle and to the gear selector; and
    a controller coupled to the actuator and configured to direct the actuator to force the gear selector into neutral during an autonomous braking event.

2. The system of claim 1 wherein the gear selector includes a gear lever and a gear selector fork connected to the gear lever, wherein the actuator is connected to the gear lever.

3. The system of claim 1 wherein the gear selector includes a gear lever and a gear selector fork connected to the gear lever, wherein the actuator is connected to the gear selector fork.

4. The system of claim 1 wherein the actuator extends to force the gear selector into neutral during an autonomous braking event.

5. The system of claim 1 wherein the actuator contracts to force the gear selector into neutral during an autonomous braking event.

6. The system of claim 1 wherein the controller is configured to direct the actuator to force the gear selector into neutral when the engine is nearing a stall.

7. The system of claim 1 wherein the controller is configured to direct the actuator to force the gear selector from neutral back into a selected gear to cause the vehicle to stop.

8. The system of claim 1 further comprising an electric park brake, wherein the controller is configured to activate the electric park brake to cause the vehicle to stop.

9. A method for shifting a manual transmission of a vehicle into neutral during autonomous braking, the method comprising:
    recognizing that autonomous braking is commanded;
    determining that the vehicle is nearing a stall; and
    forcing a gear selector into neutral position.

10. The method of claim 9 wherein forcing the gear selector into neutral position comprises directing an actuator to physically move the gear selector into the neutral position.

11. The method of claim 9 wherein determining that the vehicle is nearing a stall comprises monitoring engine speed, vehicle speed, current selected gear, and/or clutch engagement status.

12. The method of claim 9 further comprising:
    after forcing the gear selector into neutral position, ascertaining that a driver is not controlling operation of the vehicle; and
    causing the vehicle to stop.

13. The method of claim 12 wherein causing the vehicle to stop comprises forcing the gear selector from the neutral position into a selected gear.

14. The method of claim 12 wherein:
    forcing the gear selector into neutral position comprises directing an actuator to physically move the gear selector into the neutral position; and
    causing the vehicle to stop comprises directing the actuator to physically move the gear selector from the neutral position into a selected gear.

15. The method of claim 12 wherein causing the vehicle to stop comprises activating an electric park brake.

16. A vehicle capable of automatically shifting a manual transmission into neutral during autonomous braking, the vehicle comprising:
- an automatic braking system;
- an engine;
- a differential, wherein the manual transmission is configured to transfer power from the engine to the differential using gears manually selected by a gear selector; and
- an actuator for automatically shifting from a selected gear to neutral.

17. The vehicle of claim 16 wherein the actuator is physically coupled to the gear selector for forcing the gear selector into neutral during autonomous braking.

18. The vehicle of claim 16 further comprising a controller coupled to the actuator and configured to direct the actuator to shift from the selected gear to neutral.

19. The vehicle of claim 16 further comprising a controller coupled to the actuator and configured to recognize that autonomous braking is commanded, determine that the vehicle is nearing a stall, and direct the actuator to shift from the selected gear to neutral.

20. The vehicle of claim 16 further comprising a controller coupled to the actuator and configured to recognize that autonomous braking is commanded, determine that the vehicle is nearing a stall, direct the actuator to shift from the selected gear to neutral, and, direct the actuator to force the gear selector from neutral back into a selected gear to cause the vehicle to stop.

* * * * *